March 13, 1928. 1,662,569

G. FORNACA

BRAKE OF THE EXPANDING SHOE TYPE

Filed Dec. 8, 1926

Inventor
Guido Fornaca
By [signature] Atty.

Patented Mar. 13, 1928.

1,662,569

UNITED STATES PATENT OFFICE.

GUIDO FORNACA, OF TURIN, ITALY.

BRAKE OF THE EXPANDING-SHOE TYPE.

Application filed December 8, 1926, Serial No. 153,382, and in Italy December 12, 1925.

This invention provides an improved brake for motor vehicles, characterized by means for rendering the action of all the brake shoes perfectly uniform on the drum, thus considerably increasing the efficiency of the brake itself.

A feature of the invention is the particular form of the shoes and the compact arrangement of the driving, connecting and supporting members of the cams that result in a very light and sure braking means.

The annexed drawing shows a diagram of the principle of the invention and, by way of example, a constructional form of the brake applied to the fore wheel of a motor vehicle.

Figures 1, 2:
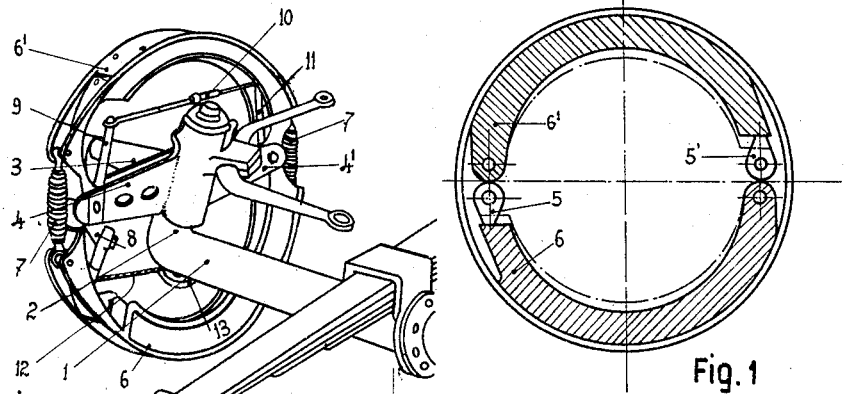
Fig. 1 is the brake diagram.
Fig. 2 is a diagrammatic perspective view of the above mentioned constructional form.

Referring to the drawing, 1 is the wheel axle having at each end the journal 2 for the steering swivel 3. The swivel is provided with two pairs of arms 4, 4' in which are mounted bushes 14, 14 supporting two cams 5, 5' that are secured on pins 15, 15.

Each bush 14 is provided with a slot into which passes the cam operating lever 8 or 11, and the end of one brake shoe rests against the cylindrical surface of the bush, which acts as a hinge and as a bearing for the shoe that reaction of which is transmitted to the supporting arms 4, 4'.

In the example shown, the cams 5, 5' are each in the shape of a cylinder one part of which is cut away parallel to its axis. This flat part constitutes the cam proper while the cylindrical part fits the corresponding bush 14 and is turnable therein on the axis of the pin 15 which is journalled in the end walls of the bush. The lever 8 for the cam 5 is formed integral with the latter and is directly operated through a rope 12 passing round a pulley 13 mounted on the axle 1, whereas the lever 11 for the other cam 5' is connected to the lever 8 for the cam 5 by means of an arm 9 carried by the lever 8 and a link 10.

Two adjacent ends of the brake shoes 6, 6' rest one against the cam 5 and the other against the cylindrical part of the bush 14, while the opposite adjacent ends of said shoes rest one against the cylindrical surface of the corresponding bush and the other against the cam 5'.

Springs 7 connect the shoes 6, 6' and constrain them towards each other.

Figure 3:
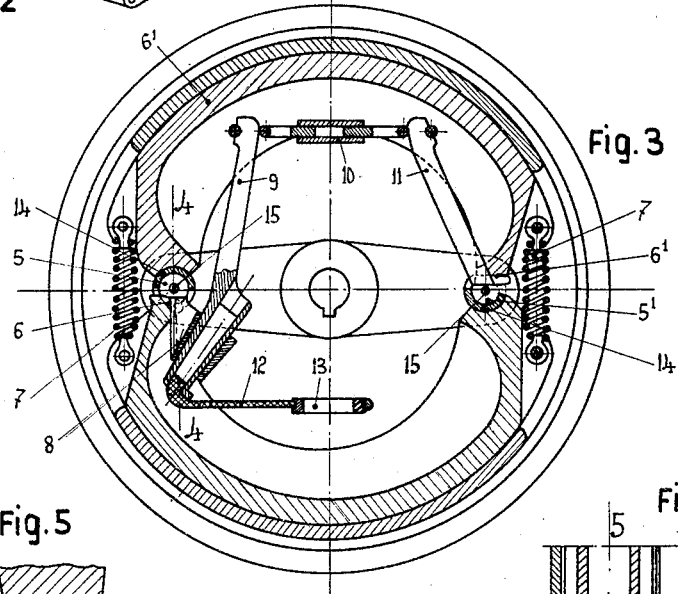
Fig. 3 is a vertical longitudinal section to a larger scale.
Figure 5:
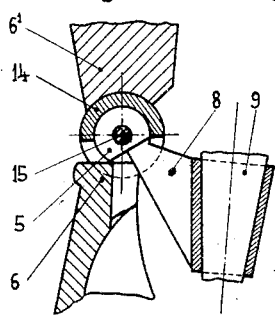
Fig. 5 is a section on the line 5—5 of Fig. 4, the cam being shown in the brake active position.

When the rope 12 is pulled, the arm 8 is caused to turn with the cam 5 about the axis of the pin 15 and the cam 5 is thereby displaced from its inactive position shown in Fig. 3 to the active position shown in Fig. 5; a similar displacement of the cam 5' is effected simultaneously by means of the levers 9—11 and link 10. The sloping parts of the cams 5, 5' displace the shoe ends with which they contact while the other end of each shoe rotates on the hinge formed by the corresponding bush 14. Thus, both shoes automatically increase their braking action in the direction of rotation of the brake drum (corresponding to a head drive).

Figure 4:
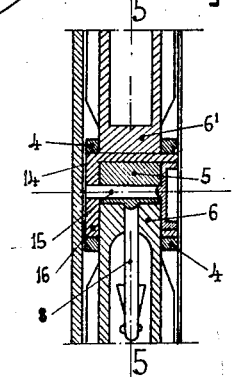
Fig. 4 is a cross section on the line 4—4 of Fig. 3, to a still larger scale.

The shoes 6, 6' are U-shaped in section (Fig. 4) in order that the cam operating members may be enclosed therein, this resulting in a very compact arrangement.

What I claim is:

1. A brake mechanism comprising in combination a steering swivel, oppositely extending parallel arms fixed to the latter, a bush having end walls mounted in the free ends of each pair of arms, a pin concentrically journalled in the end walls of each bush, a cylindrical member mounted on each pin and having a cam surface, a lever connected with each cylindrical member extending through a slot in the bush, a pair of brake shoes, each shoe having one end pivoted on one of the bushes and its other end extending into the slot of the other bush, and means to simultaneously operate the levers to rotate said cylindrical members.

2. A brake mechanism comprising in combination a steering swivel, oppositely extending parallel arms fixed to the latter, a bush having end walls mounted in the free ends of each pair of arms, a pin concentrically mounted in the end walls of the bush, a cylindrical member mounted on each pin and having a portion thereof cut away to form a cam surface, a pair of brake-shoes, each shoe having one end pivoted on one of the bushes and its other end extending into a slot formed in the other bush, a brake-drum surrounding the shoes, a two-arm lever connected to each cylinder in the central plane of the brake-drum, a link connecting the free-arms of the levers, and an actuating member connected to one of the levers.

In testimony that I claim the foregoing as my invention, I have signed my name.

GUIDO FORNACA.